United States Patent

Støle et al.

[11] Patent Number: 6,022,515
[45] Date of Patent: Feb. 8, 2000

[54] PROCESS FOR PRODUCING SILICON CARBIDE

[75] Inventors: Kjell Arnulf Støle; Sjur Vidar Velken, both of Lillesand, Norway

[73] Assignee: Norton AS, Lillesand, Norway

[21] Appl. No.: 08/750,393

[22] PCT Filed: Jun. 2, 1995

[86] PCT No.: PCT/NO95/00091

§ 371 Date: Dec. 6, 1996

§ 102(e) Date: Dec. 6, 1996

[87] PCT Pub. No.: WO95/33683

PCT Pub. Date: Dec. 14, 1995

[30] Foreign Application Priority Data

Jun. 6, 1994 [NO] Norway .................................. 942090

[51] Int. Cl.⁷ .................................................. C01B 31/36
[52] U.S. Cl. .................................................. 423/345
[58] Field of Search .................................................. 423/345

[56] References Cited

U.S. PATENT DOCUMENTS

| | | | |
|---|---|---|---|
| 4,162,167 | 7/1979 | Enomoto et al. | 423/345 |
| 4,906,324 | 3/1990 | Weaver et al. | 423/345 |
| 5,021,230 | 6/1991 | Krstic | 423/345 |
| 5,202,105 | 4/1993 | Boecker et al. | 423/345 |
| 5,258,170 | 11/1993 | Parent | 423/345 |

FOREIGN PATENT DOCUMENTS

| | | |
|---|---|---|
| 0 090 252 A1 | 10/1983 | European Pat. Off. . |
| 1208001 | 10/1970 | United Kingdom . |
| 2076385A | 12/1981 | United Kingdom . |
| 2162504 | 2/1986 | United Kingdom . |
| 2 220409A | 10/1990 | United Kingdom . |

OTHER PUBLICATIONS

Gmelins Handbuch Der Anorganischen Chemie—Silicum, 1959, p. 761–789 Verlag Chemie, GMBH, Weinheim/Bergstrasse.

*Primary Examiner*—Wayne Langel
*Attorney, Agent, or Firm*—Carstens, Yee & Cahoon; Colin P. Cahoon

[57] ABSTRACT

Silicon carbide is produced in two steps in that silicon dioxide and a carbon source in a first step is reacted at a temperature in the range of 1500–1800° C., whereby the silicon dioxide and the carbon source react to form β-silicon carbide. The resulting β-silicon carbide formed is subsequently treated at a temperature of 1800–2300° C. for conversion of the β-silicon carbide into the desired end product, via α-silicon carbide.

18 Claims, 2 Drawing Sheets

PROCESS FOR PRODUCING SILICON CARBIDE

The present invention refers to a process for producing silicon carbide. In particular the invention refers to a method for a two-step process for producing silicon carbide.

The process for industrial production of silicon carbide commonly used at the present comprises reacting a silicon source with a carbon source in an electrically heated furnace. For industrial production the so-called "Acheson"-process is used, patented in 1892 and named after the inventor of said process.

A general account re silicon carbide, properties and production thereof can i.a. be found in Kirk & Othner, Encyclopedia Chemical Technology, 2nd edition, volume 4, the pages 114–132.

From GB patent application No. 2.076.385 it is known to produce β-silicon carbide and it is stated that in order to obtain a good yield of β-silicon carbide the starting material must be present as a powder with a particle size less than 150 μm.

From GB patent application No. 2.162.504 A is known to produce β-silicon carbide by packing the reactants to a bulk-density of not more than 0,23 g/cm³ and heating the mixture for reaction at a temperature of 1500–2000° C. under an inert atmosphere. Said application also refers to a vertical continuous furnace for carrying out the process.

GB patent application No. 2.220.409 A refers to a method for preparing β-silicon carbide powder suitable as a sintering material by mixing a silicon powder of high purity and not larger than 50 μm in particle size with a carbon powder not larger than 1 μm in particle size and heating the mixture in a non-oxidizing atmosphere at a temperature of 1700–2000° C. for a period not exceeding 2 hours. Particular care should be taken not to use a temperature above 2000° C., in which case there may be a risk of phase transition from β-silicon carbide to α-silicon carbide.

GB patent No. 1.208.001 refers to a method for producing crystalline silicon carbide by heating a system comprising silicon and carbon and/or compounds of said elements together with lanthanum or a lanthanum compound to a temperature exceeding 1000° C., whereby silicon carbide crystals are deposited from a gaseous or vapour phase.

In spite of the extensive research described in the literature, the patent literature included, α-silicon carbide is still produced in accordance with the Acheson's process with comprises premixing of the starting material consisting of a carbon source and a silicon source, the latter in the form of quarts sand, and as a carbon source petrol coke is commonly used.

The premixed starting materials are introduced into large rectangular electrical resistant furnaces, the end wall of which are fitted with electrodes for electrical power supply and the side walls consisting of movable concrete sections. The oven is half filled with the mixed starting materials, and subsequently a graphite core, forming and electrical heating element is supplied, whereafter the remaining charge of the starting material is added. The reaction between the starting materials takes place at a temperature above 1500° C. and silicon carbide is formed in accordance with the following overall equation

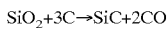

$$SiO_2 + 3C \rightarrow SiC + 2CO$$

This general reaction equation is simplified in that the end product, i.e. α-SiC, is formed via a series of intermediates, thus complicating the reactions.

In general the conversion into silicon carbide takes place via the formation of β-SiC (cubic modification) at a temperature of 1500–1800° C., whereas the transition of β-SiC into the desired end product, i.e. the hexagonal α-SiC modification, takes place in a recrystallization step at a temperature above 1800° C.

The heat is supplied in the centre of the charge of starting material, consequently a temperature gradient will develop throughout the starting material with the hottest part in the centre of the starting material with the temperature and falling towards the outer parts of the material. As a result after a appropriate reaction time, which for a large furnace can be of the order of 40 hours, this will result in that content of the furnace, from the outside to the inner part will consist of non-reacted starting material, partially reacted starting material, β-silicon carbide, α-silicon carbide and an inner core consisting of the residue of the graphite.

As a result of the above mentioned only 10–15 percent by weight of the charged starting material is converted into the desired end product, α-silicon carbide. The partially reacted and not reacted starting material, as well as β-silicon carbide are recirculated and used together with possible optionally new starting material for a new charge in the furnace. However, the use of recirculated, non-reacted and party reacted and β-silicon carbide will result in that the end product is not "green", that is α-silicon carbide of high purity. The prize for green α-silicon carbide is substantially higher than for "black", non-high purity α-silicon carbide. This will, of course, make production of green silicon carbide non-profitable if not combined with the production of black α-SiC, utilizing the non-reacted starting material resulting from the production of green α-silicon carbide.

This process for producing silicon carbide has several drawbacks: it is difficult to collect the gaseous effluents from the furnace, mainly carbon monoxide, which either burn on the surface of the charged starting material or are expelled to the atmosphere together with other gasses formed, such as sulphur dioxide and thus represent an environment problem. The carbon monoxide represents a source of energy which advantageously could be recovered if practically possible.

The further work-up of the content of the furnace is very labour intensive because non-reacted starting material and also β-silicon carbide must be removed and the rest, consisting mainly of α-silicon carbide, is taken out for further treatment, such as crushing, purification etc. to the desired end product of α-SiC. Non-reacted starting materials and partly reacted starting materials can be included as new starting material for a charge, but said material can not be used for production of high purity silicon carbide. Impurities which have vaporized from the inner hot zone of the charge will condense and deposit in the outer, cooler layer, hence said non-reacted or partly reacted starting material can only be used in the manufacture of less pure, black silicon carbide.

Hence the object of the present invention is to provide a new and improved method for preparing a more homogenous end product and by which method effluence to the atmosphere for the most part can be avoided.

In accordance with the invention the improved process for commercial production of silicon carbide comprises production in two steps; in the first step β-silicon carbide is produced, preferably continuously, whereafter the second step the β-silicon carbide in is heat treated at a temperature at which β-silicon carbide is converted into α-silicon carbide.

By producing the β-silicon carbide in a preferably continuous process one can obtain a very even quality of the β-silicon carbide with approximately 100% conversion, that is, in essence all of the charge starting material will be converted to β-silicon carbide which subsequently can be submitted to crystal growth to the desired end product, α-silicon carbide. As a substantial part of the chemical reaction leading to the β-silicon carbide takes place in the first step, the effluent generated in said step can be recovered and utilized, for instance generated carbon monoxide can be utilized as a heat source. The conversion of β-silicon carbide to α-silicon carbide takes place without substantial formation of effluent and can hence be carried out in a shaft furnace or other suitable furnace, without any particular need for purification of optional effluent.

In the first step the starting materials, silicon dioxide and carbon are reacted at a temperature in the range of 1600–1800° C. The necessary heat energy can for example be applied by means of an arc or by means of a plasma torch or any other suitable heating arrangement.

The use of a plasma torch for heating is a well known technique, and reference is made for example to U.S. Pat. No. 3,402,211 from 1968 "Methods and Devices for Heating Substances."

In practicing the instant process is preferably practiced by using a plasma torch mounted in connection with a rotating furnace, the plasma torch providing heat to a reaction chamber. Optionally a preheating chamber can be mounted before the reaction chamber in order to pre-heat the supplied starting materials consisting of silicon dioxide and a carbon source.

BRIEF DESCRIPTION OF DRAWINGS

In FIG. 1 is shown a rotating furnace without a preheating chamber. In the FIG. 1, indicates a graphite electrode or a plasma torch for heating, 2 indicates a reaction chamber in which the reactants are present. 3 shows feeding of the reactants, preferably in the in the form of pellets, and 3 also serves as an outlet for carbon monoxide. 4 shows the exit for the β-silicon carbide produced, 5 indicates a roller bearing and 6 a sealing.

FIG. 2 shows a rotating furnace provided with a preheating chamber. The same reference numbers as in FIG. 1 are also used in the corresponding parts in FIG. 2. 1' indicates a plasma torch and 2' indicates a pre-heating chamber. 7 is a magnetic coil.

Figure 1:
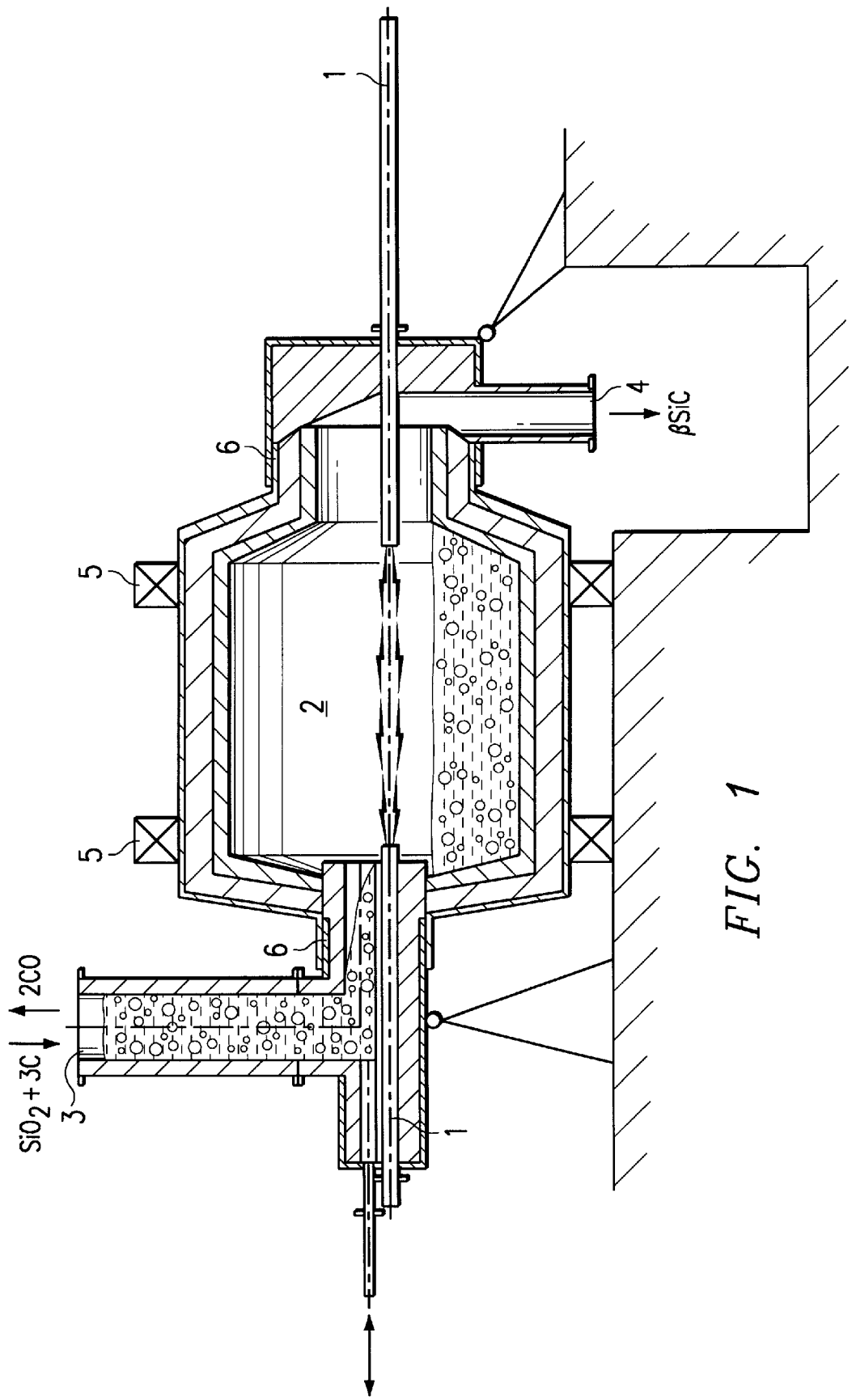
In FIGS. 1 and 2 is shown furnaces which can be used by practicing the instant process.
Figure 2:
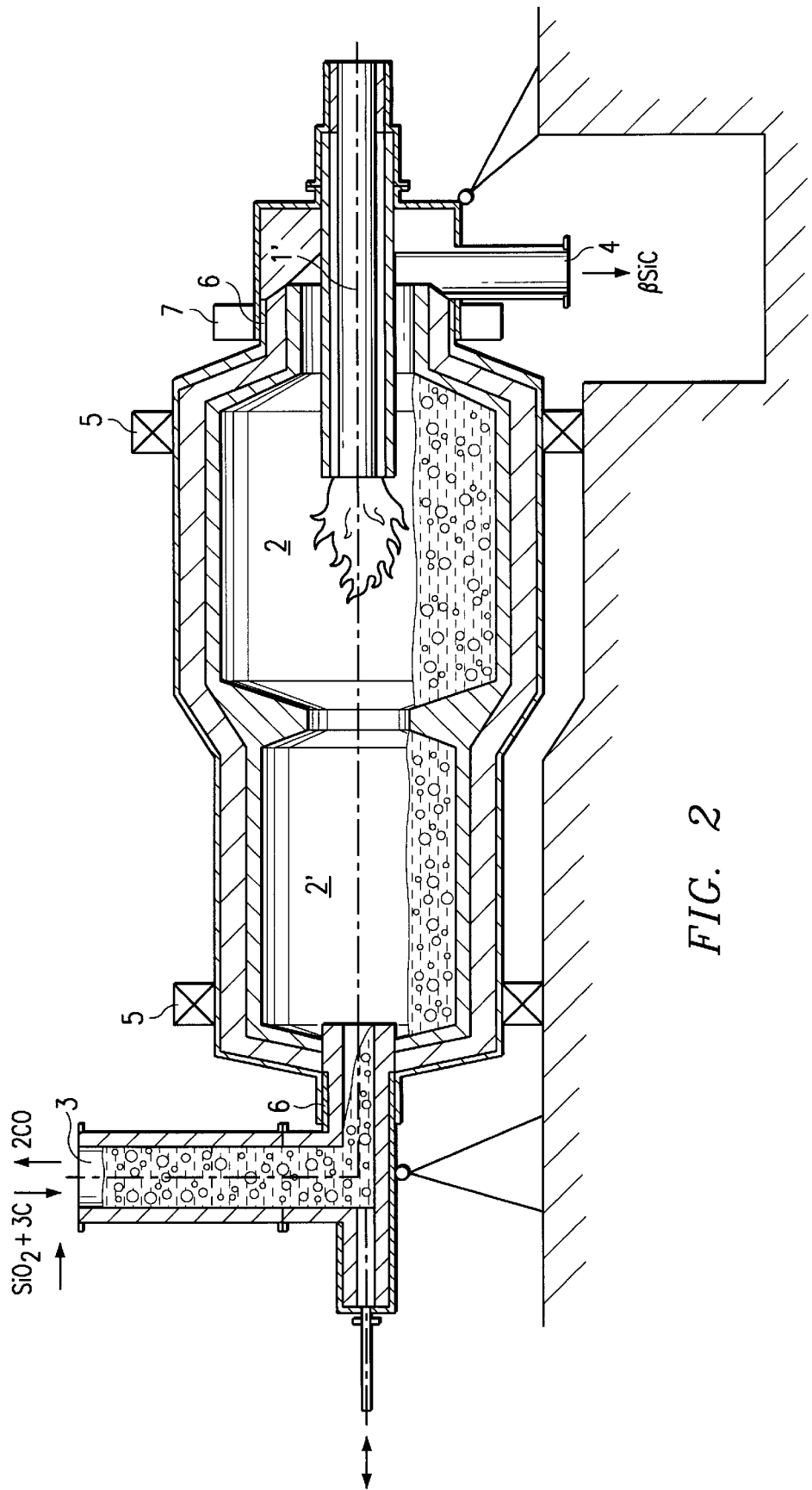

The produced β-silicon carbide with a very small particle size can be transferred for instance to a high temperature furnace, for heating to a temperature in the range above 1800° C., preferably in the range of 1800–2200° C., for a desired period of time, in order to give the desired product, α-silicon carbide with desired particle size.

Thus, the present process is a 2-step process in which β-silicon carbide is produced in the first step and in a subsequent, separate step the obtained β-silicon carbide is converted into α-silicon carbide with the desired particle size. The α-silicon carbide obtained can subsequently be converted to desired end product in a conventional manner, which will be well known for the person within the state of art.

As apparent from the above, the chemical conversion of the starting material to β-silicon carbide, the formed carbon monoxide can be separated and collected in a controlled manner and optionally purified and used as an energy source.

The present invention is advantageous in that the β-silicon carbide is produced in a pure form and can be used as such for the preparation of SiC-products of low density, grinding grit and the like, or be submitted to crystal growth and conversion into α-silicon carbide.

Prior to the conversion of the starting material to β-silicon carbide doping agents can be added to the raw material and subsequently preferably pelletized in a conventional manner and dried before being fed to the first conversion step.

In the subsequent step, the produced β-silicon carbide can then be heated to 1800–2200° C., either in a suitable high temperature furnace or by using an already existing "Acheson" furnace without causing pollution problems, because the chemical reactions taking place in the conversion of the starting material to silicon carbide already have taken place and hence discharge of CO and $SO_2$ will be substantially reduced compared with the conventional process.

Thus, the instant process for production of silicon carbide, in particular α-silicon carbide, represents an advantageous feature in respect to the known process, the chemical reactions taking place in a closed chamber so that the effluent gases can be taken care of, the obtained silicon carbide can be worked up in a conventional high temperature furnace, for instance an "Acheson"-furnace or in a suitable shaft furnace, without the danger of a discharge of gaseous reactants to the environment. The process is less work intensive and will give a improved control over the production process and lead to a hight yield of α-silicon carbide with a suitable crystal size, and also offering the possibility of producing a cleaner end product, and hence it is more profitable than the known process.

We claim:

1. A process for the production of α-silicon carbide by reacting approximately stoichiometric amounts of silicon dioxide and a carbon source in a furnace at a temperature in the range of 1500–2300° C. and ambient atmosphere, which process comprises a first step in which the silicon dioxide and the carbon source are continuously fed to a furnace and reacted at a temperature in the range of 1500–1800° C. forming β-silicon carbide, and a second step in which the thus formed β-silicon carbide continuously is withdrawn from said furnace and converted to α-silicon carbide by heat treatment at a temperature in the range of 1800–2300° C.

2. A process in accordance with claim 1, characterized in that step 1 is carried out in a closed furnace and gaseous reaction products are recovered.

3. A process in accordance with claim 1, characterized in that step 1 is carried out in a rotating furnace heated by means of a plasma torch or an arc.

4. A process in accordance with claim 3, characterized in that the silicon dioxide and the carbon source are fed to the furnace in the form of pellets.

5. A process in accordance with claim 1, characterized in that step 2 is carried out in a shaft furnace or a conventional "Acheson"-furnace.

6. A process for the production of green α-silicon carbide in non-platelet form by reacting approximately stoichiometric amounts of a silicon source and a carbon source in a furnace at a temperature in the range of 1500–2300° C., which process comprises a first step in which the silicon source and the carbon source are continuously fed to a furnace and reacted at a temperature in the range of 1500–1800° C. forming β-silicon carbide, and a second step in which the thus formed β-silicon carbide is continuously withdrawn from said furnace and converted to green α-silicon carbide in primarily non-platelet form by heat treatment at a temperature in the range of 1800–2300° C.

7. A process in accordance with claim 6, characterized in that step 1 is carried out in a closed furnace and gaseous reaction products are recovered.

8. A process in accordance with claim 6, characterized in that step 1 is carried out in a rotating furnace heated by means of a plasma torch or an arc.

9. A process in accordance with claim 8, characterized in that the silicon dioxide and the carbon source are fed to the furnace in the form of pellets.

10. A process in accordance with claim 6, characterized in that step 2 is carried out in a shaft furnace or an "Acheson" furnace.

11. A process in accordance with claim 6 in which the silicon source is in the form of quartz sand.

12. A process in accordance with claim 6 in which the carbon source is in the form of petrol coke.

13. A process for the production of α-silicon carbide by reacting approximately stoichiometric amounts of a silicon source and a carbon source in a furnace at a temperature in the range of 1500–2300° C., which process comprises a first step in which the silicon source and the carbon source are continuously fed to a furnace and reacted at a temperature in the range of 1500–1800° C. forming β-silicon carbide, and a second step in which the thus formed β-silicon carbide continuously is withdrawn from said furnace and converted to α-silicon carbide by heat treatment, without the use of platelet-enhancing materials or the flow of an inert gas through the furnace, at a temperature in the range of 1800–2300° C.

14. A process in accordance with claim 13, characterized in that step 1 is carried out in a closed furnace and gaseous reaction products are recovered.

15. A process in accordance with claim 13, characterized in that step 1 is carried out in a rotating furnace heated by means of a plasma torch or an arc.

16. A process in accordance with claim 13, characterized in that the silicon dioxide and the carbon source are fed to the furnace in the form of pellets.

17. A process in accordance with claim 13, characterized in that step 2 is carried out in a shaft furnace or an "Acheson" furnace.

18. A process in accordance with claim 13 in which the silicon source is in the form of quartz sand and the carbon source is in the form of petrol coke.

\* \* \* \* \*